United States Patent [19]
Kasahara

[11] Patent Number: 5,637,171
[45] Date of Patent: Jun. 10, 1997

[54] METHOD OF PREPARING POLYVINYL CHLORIDE SHEETS FOR MEMBRANE PRESS FORMING

[75] Inventor: Yasuo Kasahara, Tokyo, Japan

[73] Assignee: Riken Vinyl Industry Co., Ltd., Tokyo, Japan

[21] Appl. No.: 308,211

[22] Filed: Sep. 19, 1994

Related U.S. Application Data

[63] Continuation of Ser. No. 819,973, Jan. 13, 1992, abandoned.

[30] Foreign Application Priority Data

Jan. 16, 1991 [JP] Japan ................................ 3-044545

[51] Int. Cl.⁶ ........................................... B31F 1/22
[52] U.S. Cl. .................... 156/209; 156/182; 156/235; 156/309.9; 156/324; 156/324.4
[58] Field of Search ........................ 156/209, 324, 156/182, 235, 309.9, 324.4

[56] References Cited

U.S. PATENT DOCUMENTS

| | | | |
|---|---|---|---|
| 2,331,794 | 10/1943 | Mallory | 53/419 |
| 2,554,150 | 5/1951 | Moore | 156/152 |
| 3,660,200 | 5/1972 | Anderson et al. | 156/324.4 |
| 3,660,220 | 5/1972 | Anderson et al. | 156/324.4 |

FOREIGN PATENT DOCUMENTS 57-70690  5/1982  Japan ................................ 156/235

*Primary Examiner*—John J. Gallagher
*Attorney, Agent, or Firm*—Oblon, Spivak, McClelland, Maier & Neustadt, P.C.

[57] ABSTRACT

A method for preparing polyvinyl chloride sheets for membrane press forming which comprises contact bonding of a preheated first polyvinyl chloride sheet on the heating drum, contact bonding of at least one other layer of preheated polyvinyl chloride sheet thereon, contact bonding of a transfer film thereon and embossing by emboss-roll thereon, wherein said transfer film has a laminated structure comprising a polyester film, a release coat layer, a resin coat layer and a hot melt coat layer successively from the surface layer. The method of the present invention provides a sheet for membrane press forming which has excellent stain and scratch resistance. Furthermore, after this sheets is subjected to overlay-laminate forming on materials such as plywood and the like, splendid forms can be obtained without surface cracks caused by expansion.

5 Claims, 1 Drawing Sheet

METHOD OF PREPARING POLYVINYL CHLORIDE SHEETS FOR MEMBRANE PRESS FORMING

This application is a continuation of application Ser. No. 07/819,973, filed on Jan. 13, 1992, now abandoned.

BACKGROUND OF THE INVENTION

1. Field of the Invention

The present invention relates to a method for preparing polyvinyl chloride sheets suitable for a membrane press forming such as vacuum press forming or air-pressure forming. More particularly, the present invention relates to decorative laminated sheets of polyvinyl chloride for membrane press forming, which are stain-resistant, scratch-resistant and very glossy.

2. Description of the Related Art

Since polyvinyl chloride has superior properties such as being an inexpensive general-purpose resin, having excellent forming properties, and being easy to add color to and print on, it is widely used for membrane press forming such as vacuum press forming or air-pressure forming. In such cases, the following processes are usually conducted: sheets of polyvinyl chloride of the desired thickness, colored or surface printed a desired color, are heated to the vicinity of the softening point; the heated sheets are placed over an adherend in a predetermined form, e.g. wooden matter which will form the door of a kitchen set; the adherend is covered by an additional membrane having unrestricted expansion and contraction, e.g. a rubber membrane, which is pressurized by air or liquid, so that the surface of the adherend is covered uniformly by the polyvinyl chloride sheet.

The surfaces of polyvinyl chloride sheets used for membrane press forming have been finished by hard-coating, such as UV-cure type, which confer stain resistance, scratch resistance and resistance to ultraviolet light on the sheets, which are prepared mainly by a calendering process. However, stripes caused during coating have become a problem when the surface is given a very glossy mirror-like finish. The ultraviolet coating compounds often lack expansion which causes crack to form during membrane press forming and the like. On the other hand, although substrate films such as polyester film may be printed on and transferred to polyvinyl chloride sheets, adhesion of transfer films to the substrate films usually requires heating the back of the substrate film during lamination of the PVC sheets but this leads to a deficit of heat. It is difficult to produce a polyvinyl chloride sheet of sufficient thickness with an even surface by the calendering process alone.

SUMMARY OF THE INVENTION

Accordingly, the object of the present invention is to provide excellent membrane press forming sheets obtained by laminating polyvinyl chloride and laminating and embossing a transfer film using a laminating process referred to as doubling and embossing, said transfer film having a special multi-layer construction.

The present invention provides a method for preparing polyvinyl chloride sheets for membrane press forming which comprises contact bonding a preheated first polyvinyl chloride sheet 7 on the heating drum 10, contact bonding at least one other layer of preheated polyvinyl chloride sheet 6 thereon, contact bonding a transfer film 5 thereon and emboss-rolling and embossing by emboss-roll over the transfer film wherein the transfer film has a triple coated structure comprising a polyester film layer 1, a release coat layer 2, a resin coat layer 3 and a hot melting coat later 4 successively from the surface layer.

DETAILED DESCRIPTION OF THE INVENTION

The present invention will be illustrated in further detail with reference to the above drawings.

Figure 1:
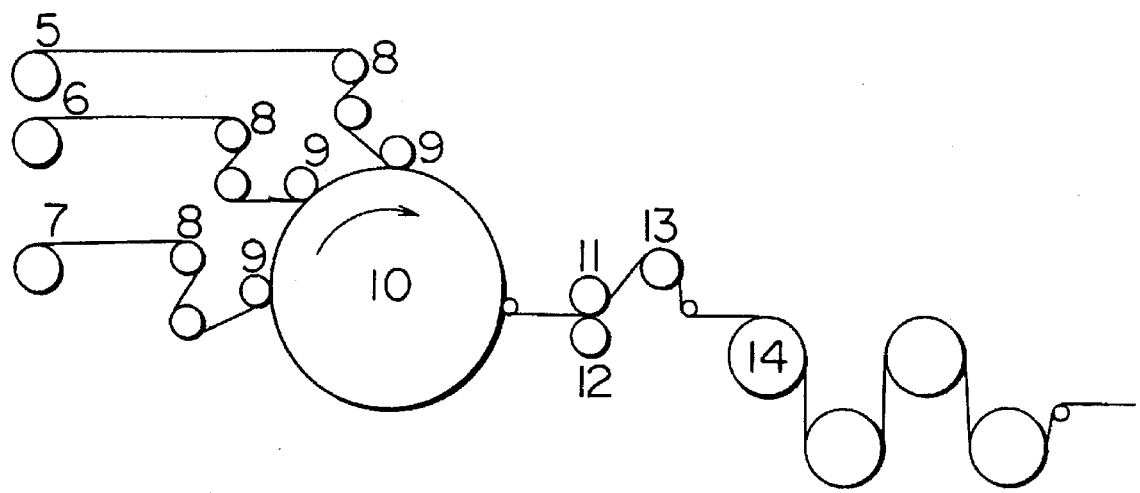
FIG. 1 is a schematic diagram, showing an overview of the method of the present invention.

FIG. 1 is a schematic diagram showing an overview of the method of the present invention. In this drawing, reference numeral 10 is a heating drum, the surface of which is heated to about 140°–180° C. Reference numerals 6 and 7 represent polyvinyl chloride sheets which are generally composed of unplasticized or semirigid polyvinyl chloride with a degree of polymerization is about 450 to 1300. If necessary, these polyvinyl chloride sheets may be colored, printed or composed of filler. First polyvinyl chloride sheet 7 is preheated by preheating roller 8, and contact bonded to the heating drum 10 by contact bonding roller 9. At least one layer of another polyvinyl chloride sheet 6 is then preheated on the polyvinyl chloride sheet by preheating roller 8, and contact bonded by contact bonding roller 9. Then the transfer film 5 is preheated on the polyvinyl chloride sheet by preheating roller 8, and contact bonded to the laminated polyvinyl chloride sheet on the drum by contact bonding roller 9. Then, the thus laminated sheet is rolled by a pair of rollers, emboss roll 11 and rubber roll 12, and cooled by cooling roll 14 to obtain a final product. The emboss roll may be marked by suitable patterns, i.e. a wood-finish effect or a grain pattern and the like, or have a mirror finish.

Figure 2:
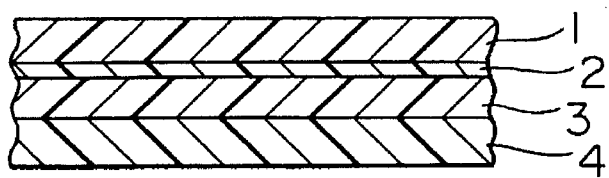
FIG. 2 is a diagram showing the layered construction of the transfer film used in the present invention.

As shown in FIG. 2, the transfer film used in the present invention has a laminated structure comprising a polyester film layer 1, a release coat layer 2, a resin coat layer 3 and a hot melting coat layer 4 successively from the surface layer. Therefore, as described above, when the transfer film is applied to the surface of the polyvinyl chloride sheet, it is protected by the polyester film and will not be scarred or stained during handling immediately before forming such as rolling up, cutting off and transportation. Suitable selection of the release coat layer 2 controls the strength of release and prevents premature release or more adhesion than required. When the substrate polyester film is released patterns printed or coated on the substrate film via the resin coat layer are transferred to the polyvinyl chloride sheet and become the surface of the formed piece itself. In such a case, suitable selection of resin coat layer 3 can prevent cracking or delustering during membrane press forming even if the resin coat layer is expanded by 100% or more.

The polyvinyl chloride sheet used in the present invention may be a polymer or a copolymer of polyvinyl chloride, or a blend thereof. General plasticizing agents, stabilizing agents and the like may be used, and if necessary, ultraviolet absorbers, antioxidants, pigments, inorganic matter or the like may be added.

The thickness of polyester film which forms the substrate of the transfer film is generally 6 to 100 μm, preferably 12 to 25 μm.

EXAMPLES

The present invention is illustrated further by following Examples.

Example 1

Unplasticized white polyvinyl chloride sheets (composition: degree of polymerization, 700; Sn stabilizers; 10 parts by weight of titanium white added; thickness, 0.52 mm; made by RIKEN VINYL INDUSTRY CO., LTD.) were passed from middle stage 6 and lower stage 7 shown in FIG. 1 through the preheating roller 8 at 80° C., then rolled around a mirror drum having a diameter ($\phi$) of 1000 millimeters heated to 170° C. while being contact bonded by the press roller 9. Meanwhile, from upper stage 5 a transfer film (made by RIKEN VINYL INDUSTRY CO., LTD) composed as shown in FIG. 2 was passed through preheating roller 8 heated to 30° C. and contact bonded on the mirror drum and the polyvinyl chloride sheet heated and fusion bonded thereon so that the hot melt coat layer was applied to the surface of the polyvinyl chloride sheet.

Then, the sheet of fused matter was removed from the heated drum, was nipped between mirror emboss roll 11 (iron product chrome plated surface) and rubber roll 12 (silicone rubber roll), and then the mirror surface of the emboss roll was embossed onto the surface of the sheet of the fused matter. The sheet of fused matter was then passed through cooling roll 14 and rolled up. The line speed was about 4 m/min.

As a result, a sheet with the properties shown in Table 1 was obtained.

The structure of the transfer film used in the present invention was as follows:

successively from the outer most layer.
1) Polyester substrate (made by Toray Industries, Inc.)
2) Release coat layer (acrylic resin-wax mixture type)
3) Resin coat layer (polyurethane type)
4) Hot melt coat layer (polyvinyl chloride/vinyl acetate type)

TABLE 1

| Properties | Measurement Result | Measurement Method |
|---|---|---|
| thickness | 1.0 millimeter | 1/100 micrometer |
| glossiness (60°) | 85–86 | GMX-202 (made by Murakami Color Research Center Inc.) |
| adhesion of resin layer surface-treated | good | removed of adhesive cellophane tape, crosscutting |
| pencil hardness | F | JIS K 5400 300 g of load |
| stain resistance | normal | stain with oil-based marker ink, aqueous ink or household spices, wipe off with water or methanol |
| surface appearance of the sheet | good, no air marks or gross irregularities | visual observation |

Example 2

As in Example 1, an unplasticized white polyvinyl chloride sheet (composition: degree of polymerization, 700; Sn stabilizers; 10 parts by weight of titanium white added; thickness, 0.27 mm; made by RIKEN VINYL INDUSTRY CO., LTD.) from middle stage 6 shown in FIG. 1 and semirigid gray polyvinyl chloride (composition: degree of polymerization, 800; 8 parts by weight of DOP, Cd—Ba stabilizers; 7 parts by weight of titanium white and a small amount of carbon black; thickness, 0.1 mm; made by RIKEN VINYL INDUSTRY CO., LTD.) from lower stage 7 were rolled and contact bonded around a mirror drum heated to 160° C. Meanwhile, from an upper stage 5 the same transfer film as used in Example 1 was contact bonded by the same method as in Example 1. Then, the sheet of fused matter was released from the heated drum, nipped between sand-like finish emboss roll 11 (iron product, mill engraving method) and rubber roll 12, cooled and rolled up. As a result, a sheet was obtained which was embossed to a sand-like finish and had great gross. The measurement results are shown in Table 2.

TABLE 2

| Properties | Measurement Result | Measurement Method |
|---|---|---|
| thickness | 0.35 millimeter | 1/100 micrometer |
| glossiness (60°) | 42–44 | GMX-202 (made by Murakami Color Research Center Inc.) |
| adhesion of resin layer surface-treated | good | removed of adhesive cellophane tape |
| pencil | F | JIS K 5400 300 g of load |
| stain resistance | normal | same as for Table 1 |
| surface appearance of the sheet | good, no air marks or gross irregularities | visual observation |

Example 3

A hard clear polyvinyl chloride sheet (degree of polymerization, 700; unplasticized; Sn stabilizers; thickness, 0.55 mm; made by RIKEN VINYL INDUSTRY CO., LTD.) from middle stage 6 shown in FIG. 1 and top-printed semirigid white base polyvinyl chloride (degree of polymerization, 800; 8 parts by weight of DOP, Cd—Ba stabilizers; 15 parts by weight of titanium white; film made by RIKEN VINYL INDUSTRY CO., LTD.; print made by JAPAN DECOR PRINT CO., LTD.) from lower stage 7 were contact bonded under the same conditions as in Example 1. Meanwhile, from upper stage 5 the same transfer film as used in Example 1 was contact bonded by the same method as in Example 1. Then the sheet of fused matter was removed from the heated drum, nipped between mirror surface emboss roll 11 and a rubber roll 12, cooled and rolled up. As a result, a sheet with the same properties as in Table 1 was obtained, its thickness being 0.62 mm (measured by a 1/100 micrometer).

Comparative Example 1

From middle stage 6 and upper stage 5, the same unplasticized white polyvinyl chloride sheets as in Example 1 (thickness 0.52 mm) were contact bonded to the heated drum. From lower stage 7 the same transfer film as used in Example 1 was contact bonded so that a hot melt coat layer was applied to the surface of the polyvinyl chloride sheet. This sheet when nipped between a mirror emboss roll 11 and a rubber roll 12 had many air marks on its surface, and had a poor mirror surface.

Example 4

When the sheets prepared in Examples 1, 2 and 3 were coated by a gravure coating machine on the back with a primer (polyvinyl chloride; nonvolatile content, 20%), the polyester transfer film substrate was not released and could be rolled up without hindrance.

Example 5

It was possible to overlay-laminate each sheet obtained from Example 4 to the surface of plywood (hereafter "MDF") using a membrane press forming machine (air-pressure and vacuum press system) as explained below.

MDF is a plywood in which wood chip from pinaceous or lauan wood is broken up finely, pressed and hardened, and is often cut in the form of door (size, about 400 mm×600 mm; thickness, about 18 to 40 mm) forming part of system kitchens and the like, the edges and the corners of which are subjected to the curved surface processing (about 3R to 10R). The upper surfaces of some MDFs are engraved with decorative grooves. For example, MDF surface in the form of a door was coated with polyurethane type adhesive, and then the surface-treated polyvinyl chloride obtained in Example 4 was placed thereon, and it was possible to overlay-laminate it using the above-mentioned membrane press forming machine, with a press temperature of 70°–80° C., a press pressure of 4–6 kg/cm$^2$ and a press time of 90–240 seconds.

Membrane press formed products had the same surface properties as the sheets alone, and crack or delustering in the surface-treated layer (resin layer) was not observed in the parts expanded during forming, e.g. the edges and the corners of the doors or the grooves in the decorated articles.

Comparative Example 2

As a comparative example, unplasticized black polyvinyl chloride sheets (degree of polymerization, 700: Sn stabilizers; 3.5 parts by weight of carbon black pigment added; made by RIKEN VINYL INDUSTRY CO., LTD.) were coated with an ultraviolet cure coating (acrylurethane), and then sheets were prepared in which the surface coat layers were cured by ultraviolet radiation. Furthermore, when the sheets were subjected to membrane press forming (under the same conditions) as in Example 5, cracks were formed in the corners of the doors and the channels of the decorated articles.

Example 6

When sheets prepared in Example 4 were transported, the polyester film of the transfer film substrate could not be easily released and in addition acted as both a protective film of the highly-glossy surface-treated layers and to prevent transfer of the primer to the surface-treated layer during rolling up after a primer coating.

Since the present invention is formed in the above way, it is possible to obtain sheets for membrane press forming which are excellent in stain and scratch-resistance. Since multi-layer polyvinyl chloride sheets can also be prepared, color development and patterns may be arranged optionally on them, and it is possible to freely adjust their thickness.

Furthermore, these sheets may be subjected to overlay-laminate forming on materials, such as plywood without surface cracks caused by expansion resulting thereby.

What is claimed is:

1. A method for preparing polyvinylchloride sheets for membrane press forming, which comprises:

contacting a preheated first polyvinylchloride sheet on a heated mirror drum;

contact bonding at least one other layer of preheated polyvinylchloride sheet thereon;

contact bonding a transfer film on said at least one other polyvinylchloride sheet and embossing the resulting contact bonded polyvinylchloride sheet-transfer film structure by an embossing roll, wherein said transfer film is of a four-layered structure comprising successively a polyester film, a release coat layer, a resin coat layer, which prevents cracking or delustering of the polyvinylchloride during press forming, and a hot melt coat layer, the hot melt coat layer of the transfer film contacting the at least one other polyvinylchloride sheet.

2. The method as claimed in claim 1 wherein said release coat layer is an acrylic resin mixed with wax, said resin coat layer is a urethane resin, and said hot melt coat layer is a polyvinyl chloride/vinyl acetate resin.

3. The method as claimed in claims 1 wherein said polyester film has a thickness of 6 to 100 μm.

4. The method as claimed in claims 1, wherein the polyvinyl chloride sheets for membrane press forming consist of said first and at least one other polyvinyl chloride sheet and said transfer film.

5. A method for preparing polyvinyl chloride sheets for membrane press forming, which comprises:

contacting a preheated first polyvinyl chloride sheet on a heated drum;

contact bonding at least one other layer of preheated polyvinyl chloride sheet thereon; and contact bonding a transfer film on said at least one other polyvinyl chloride sheet and embossing the resulting contact bonded polyvinyl chloride sheet-transfer film structure by an embossing roll, wherein said transfer film is of a four-layered structure comprising successively a polyester film, an acrylic resin-wax release coat layer, a polyurethane resin coat layer, which prevents cracking or delustering of the polyvinyl chloride during press forming, and a polyvinyl chloride-vinyl acetate hot melt coat layer, the hot melt coat layer of the transfer film contacting the at least one other polyvinyl chloride sheet.

* * * * *